(12) United States Patent
Offer

(10) Patent No.: US 6,658,094 B1
(45) Date of Patent: Dec. 2, 2003

(54) METHOD AND APPARATUS FOR STORING VOICE/FAX MESSAGES IN AN INTELLIGENT NETWORK

(75) Inventor: Gero Offer, Gilching (DE)

(73) Assignee: Siemens Aktiengesellschaft, Munich (DE)

( * ) Notice: Subject to any disclaimer, the term of this patent is extended or adjusted under 35 U.S.C. 154(b) by 32 days.

(21) Appl. No.: 09/609,506

(22) Filed: Jul. 3, 2000

(30) Foreign Application Priority Data

Jul. 2, 1999 (DE) .......................... 199 30 746

(51) Int. Cl.$^7$ ............................................. H04M 1/64
(52) U.S. Cl. ............................ 379/88.25; 379/93.23; 379/74; 379/88.13; 370/241; 358/407
(58) Field of Search .................... 379/93.07, 88.14, 379/23, 88, 112, 88.13, 88.22, 119, 88.12, 67.1; 179/7.1; 370/241; 358/402, 407; 455/414

(56) References Cited

U.S. PATENT DOCUMENTS

| | | | |
|---|---|---|---|
| 4,371,752 A | * 2/1983 | Matthews et al. | 379/119 |
| 5,508,817 A | 4/1996 | Kunigami | |
| 5,684,862 A | 11/1997 | Finnigan | |
| 5,712,907 A | * 1/1998 | Wegner et al. | 358/402 |
| 5,732,124 A | * 3/1998 | Harris et al. | 379/23 |
| 5,740,230 A | * 4/1998 | Vaudreuil | 379/88.22 |
| 5,790,639 A | * 8/1998 | Ranalli et al. | 379/100.08 |
| 5,956,390 A | * 9/1999 | McKibben et al. | 379/93.07 |
| 6,064,723 A | * 5/2000 | Cohn et al. | 379/88.14 |
| 6,154,644 A | * 11/2000 | Murray | 455/414 |
| 6,351,522 B1 | * 2/2002 | Vitikainen | 379/88.12 |

FOREIGN PATENT DOCUMENTS

| | | |
|---|---|---|
| JP | 04 207 843 | 7/1992 |
| JP | 06 268 799 | 9/1994 |
| WO | WO 99/12328 | 3/1999 |

OTHER PUBLICATIONS

"Message Transport & Routing Service (MTRS), Technical Service and Architecture Description Special Report, (SR–INS–002662 Issue 1)", MTRS Technical Service and Architecture Description, Bellcore, May 1993.*

* cited by examiner

Primary Examiner—Fan Tsang
Assistant Examiner—Gerald Gauthier
(74) Attorney, Agent, or Firm—Laurence A. Greenberg; Werner H. Stemer; Ralph E. Locher

(57) ABSTRACT

Voice/fax messages are stored in an intelligent network. A network server receives an incoming call from a subscriber and, if the incoming call contains a voice/fax message, a trigger device is used to call up a voice/fax storage service which stores the voice/fax message either on a voice/fax storage server or in a subscriber terminal of the called subscriber. The corresponding apparatus has a callback device which is driven when a given time period is exceeded or when the message has been retrieved.

15 Claims, 2 Drawing Sheets

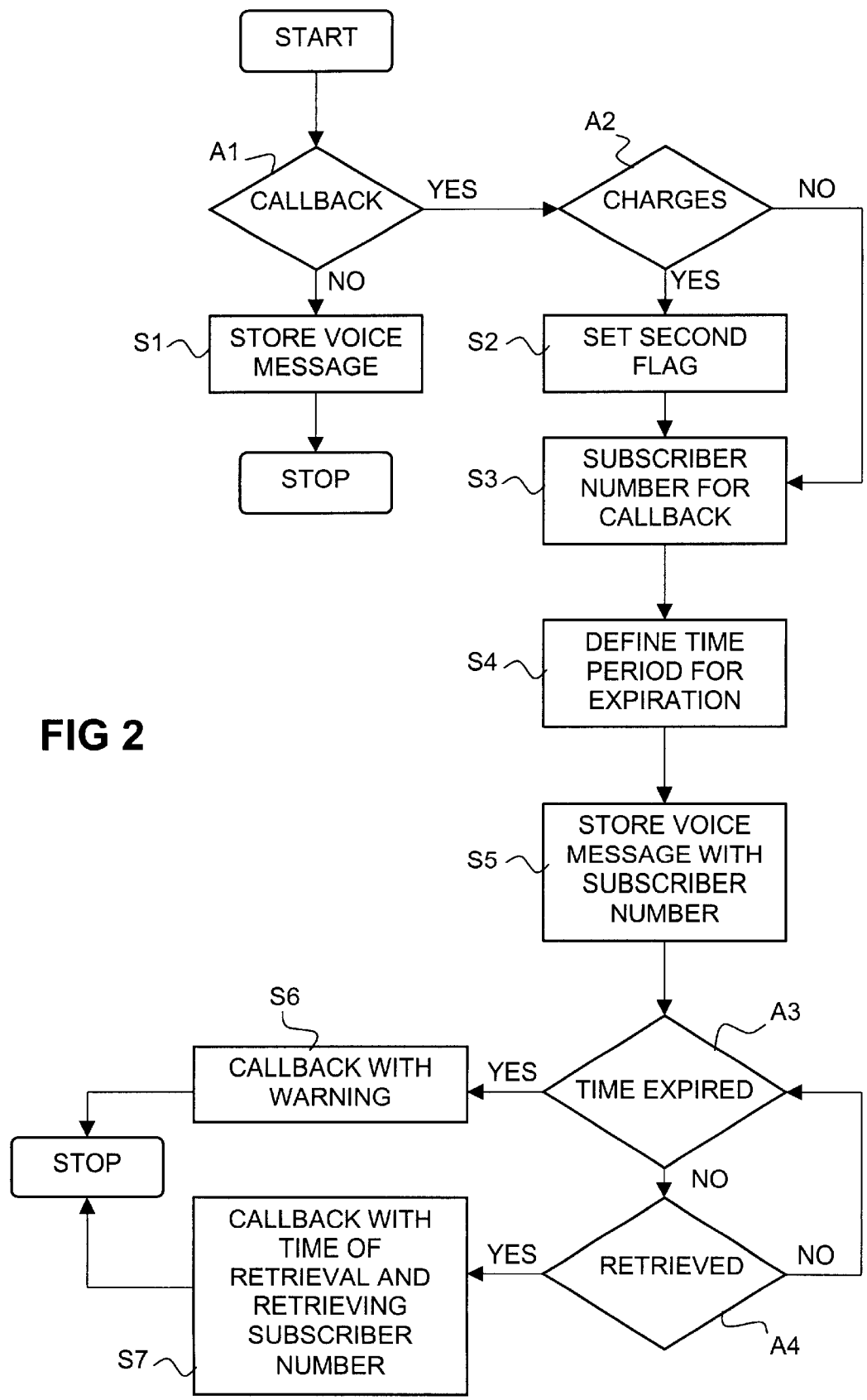

METHOD AND APPARATUS FOR STORING VOICE/FAX MESSAGES IN AN INTELLIGENT NETWORK

BACKGROUND OF THE INVENTION

Field of the Invention

The invention lies in the communications field. More specifically, the invention relates to a method for storing voice/fax messages in an intelligent network, where a network server receives an incoming call from a subscriber and, if the incoming call contains a voice/fax message, a trigger device is used to call up a voice/fax storage service which stores the voice/fax message either on a voice/fax storage server or in a subscriber terminal of the called subscriber. There is also provide an apparatus for carrying out the method, wherein a network server has a trigger device and a control device and the trigger device drives the control device to call up a voice/fax storage service, and the control device is connected to a voice/fax storage server or to a subscriber terminal.

In telecommunications networks, a first subscriber calling a second subscriber who is absent has the option of leaving a voice/fax message, for example in a subscriber terminal or on a mailbox of the second subscriber, which is available on a server in the telecommunications network. The second subscriber can then retrieve the voice/fax message either directly on her subscriber terminal or by checking her mailbox. More highly developed convenience telephones are often equipped with a so-called outcalling feature, where the second subscriber is automatically called, for instance on a mobile phone number or a pager, and informed about a voice/fax message which has been received.

Despite the possibilities provided for subscribers by intelligent networks, the first subscriber currently has no way of telling whether, when and by whom his voice/fax message has been retrieved, unless he is called back by the second subscriber, who has retrieved her voice/fax message.

SUMMARY OF THE INVENTION

The object of the invention is to provide a method for storing voice/fax messages in an intelligent network, and an apparatus for carrying out the method, which overcomes the above-noted deficiencies and disadvantages of the prior art devices and methods of this kind, and which allows the first subscriber to obtain information whether or not his voice/fax message has been retrieved, and if so by whom and when.

With the above and other objects in view there is provided, in accordance with the invention, a method of processing messages in an intelligent network, which comprises:

receiving in a network server an incoming call from a first subscriber and, if the call contains a message, calling up a storage service with a trigger device, and storing the message on one of a storage server and in a subscriber terminal of a subscriber being called;

storing with the storage service a subscriber number transmitted together with the message;

starting a timer in the network server; and if appropriate signaling is present, setting a first flag, in one of the storage server and the subscriber terminal, for a callback to the first subscriber when the message is retrieved or when a prescribed timer value is exceeded.

In accordance with an added feature of the invention, the message is a voice/fax message and the calling-up step comprises calling up a voice/fax message service and storing the voice/fax message in a voice/fax storage server.

In other words, in the method according to the invention for storing voice/fax messages in an intelligent network, where a network server receives an incoming call from a subscriber and, if the incoming call contains a voice/fax message, a trigger device is used to call up a voice/fax storage service which stores the voice/fax message either on a voice/fax storage server or in a subscriber terminal of the called subscriber is wherein the voice/fax storage service stores in the voice/fax storage server or in the subscriber terminal a subscriber number transmitted together with the voice/fax message, starts a timer in the network server and, when there is appropriate signaling, sets a first flag in the voice/fax storage server or in the subscriber terminal for the subscriber number to be called back when the voice/fax message is retrieved or when a prescribed timer value is exceeded.

This means that a calling subscriber wanting to leave a voice/fax message for a called subscriber has the option of transmitting with the voice/fax message a subscriber number which is automatically called back when the voice/fax message is retrieved. To achieve this, the voice/fax storage service sets a first flag in the voice/fax storage server or in the subscriber terminal. If, before the voice/fax message is retrieved, a prescribed timer value of the timer which was started when the voice/fax message was stored is exceeded, then the subscriber is also called back. This tells the subscriber that his voice/fax message has not been checked within a prescribed time period. This is a particular advantage in the case of time-critical voice/fax messages. The first flag is not set if, before the voice/fax message is stored, the network server receives appropriate signaling. By this means the calling subscriber can, by way of example, enter a particular combination of digits to signal to the network server that he does not want callback. In this case, the voice/fax message is stored as on a normal answering machine.

In accordance with an additional feature of the invention, the storage service sets a second flag in the network server, for booking charges incurred with the callback to a given subscriber number. This advantageously prevents the called subscriber, for whom there is the voice/fax message, from having to bear the charges for the callback.

In accordance with another feature of the invention, a text message is sent to the subscriber number in the callback, the text message contains a time data record when the message was retrieved or a warning report if the prescribed time period has been exceeded without a retrieval of the message.

In accordance with a further feature of the invention, the sending step comprises sending a text message to a mobile terminal as an SMS communication. Alternatively, or in addition, a text message is sent to a pager. The text message contains either a time data record for retrieval of the voice/fax message or a warning report if the prescribed time period has been exceeded.

With the above and other objects in view there is also provided, in accordance with the invention, an apparatus for storing messages in an intelligent network, wherein a network server has a trigger device and a control device, the trigger device drives the control device to call up a message storage service, and the control device is connected to a voice/fax storage server or to a subscriber terminal, the improvement which comprises:

a callback device connected to and driven by the control device for initiating automatic callback, and a timer connected to and driven by the control device for starting the callback device when a prescribed timer value is exceeded.

In accordance with again a further feature of the invention, the network server has a charge device for recording charges, the charge device being connected to and driven by the control device.

In accordance with a concomitant feature of the invention, the timer has a counter, a register for storing the prescribed timer value and a comparator, the comparator comparing a register content and a counter reading and, if the register content and the counter reading are the same, the comparator outputting a signal for evaluation by the control device.

Other features which are considered as characteristic for the invention are set forth in the appended claims.

Although the invention is illustrated and described herein as embodied in a method and apparatus for storing voice/fax messages in an intelligent network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a flowchart illustrating the method according to the invention for storing voice/fax messages in an intelligent network.

DESCRIPTION OF THE PREFERRED EMBODIMENTS

Figure 1:
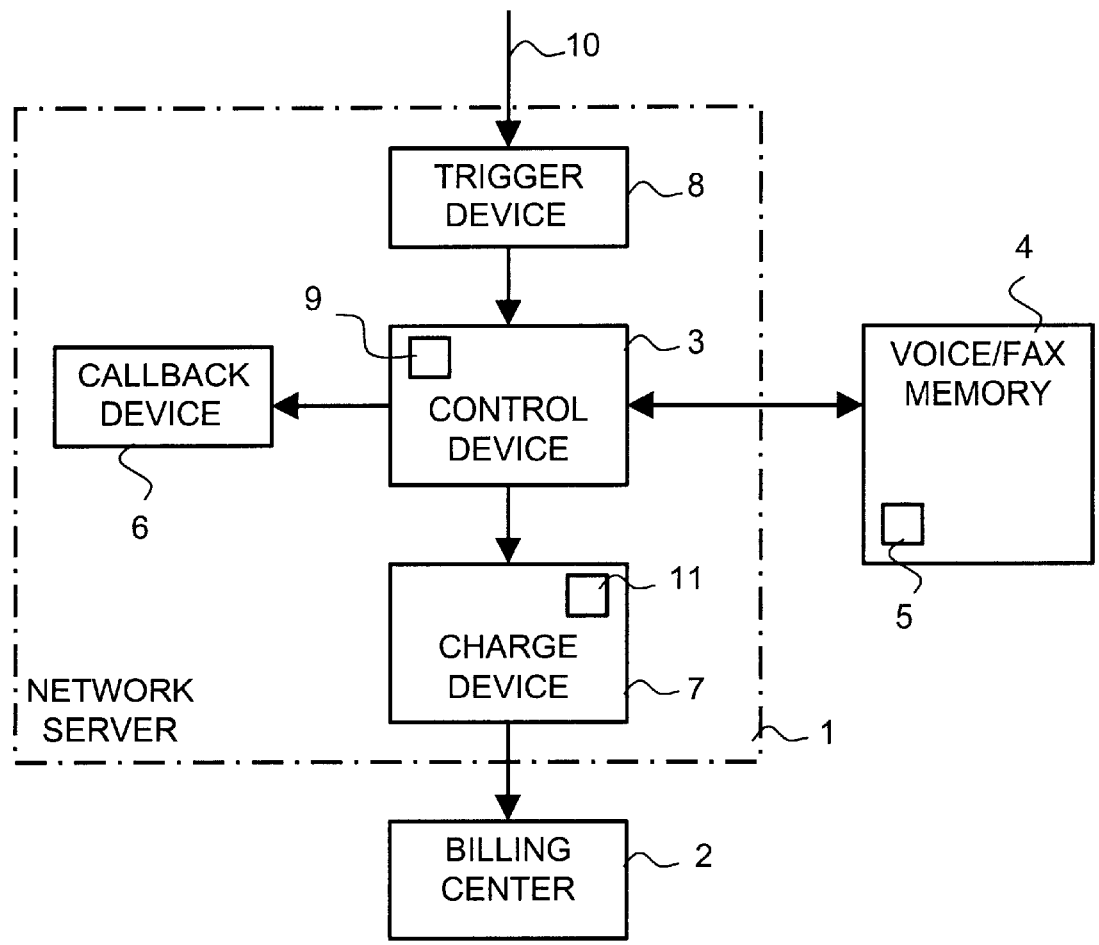
FIG. 1 is a block diagram of the apparatus for storing voice/fax messages in an intelligent network.

Referring now to the figures of the drawing in detail and first, particularly, to FIG. 1 thereof, there is seen a network server 1 receiving incoming subscriber calls.

The network server 1 has a trigger device 8 to which the incoming calls 10 are passed. The trigger device 8 calls up a voice/fax storage service if, by way of example, a called subscriber has connected her voice mailbox. To this end, the trigger device 8 transmits an activation signal for activating the voice/fax storage service to a control device 3 in the network server 1. The control device 3 is connected to a voice/fax storage server 4, which stores voice/fax messages for subscribers. The voice/fax storage server 4 has a first flag 5 which is set by the control device 3 when a voice/fax message is stored if a calling subscriber requests automatic callback for his voice/fax message.

The control device 3 in the network server 1 has a timer 9 which is started when a voice/fax message is stored and when a calling subscriber requests automatic callback. The timer, in turn, has a counter, a register and a comparator, which compares the output value from the counter and a value stored in the register with one another. The register stores a value, on the basis of a time period, which indicates when automatic callback is to take place if the voice/fax message has not been checked. This value can be prescribed by the first calling subscriber. The callback or acknowledgement is initiated, amongst other things, by the comparator, which, if the counter value and the value stored in the register are the same, outputs a signal that triggers an automatic callback.

To achieve this, a callback device 6 in the network server 1 is started and sends a text message to the subscriber number stored with the voice/fax message. The text message contains a warning report that the voice/fax message has not been retrieved within the time period prescribed by the subscriber who left the voice/fax message.

If, on the other hand, the voice/fax message is retrieved within the prescribed time period, and if the first flag 5 in the voice/fax storage server 4 is set for automatic callback for the voice/fax message, then the control device 3 likewise initiates automatic callback to the subscriber number stored with the voice/fax message, using the callback device 6. In that case, the subscriber corresponding to the subscriber number is sent a text message having a time data record which contains the instant and the date on which the voice/fax message was retrieved, and having the subscriber number of the subscriber who retrieved the voice/fax message.

The network server 1 also has a charge device 7 which records the charges for automatic callback and codes them for the subscriber whose subscriber number is stored with the voice/fax message and who receives the automatic callback. To achieve this, the charge device has a second flag 11, which is set if the subscriber receiving the automatic callback is to accept the charges for the callback. If, on the other hand, the subscriber for whom the voice/fax message was left is to accept the charges, the second flag 11 remains unset. The charge device 7 transmits the charge data for a callback to a billing center 2, which evaluates the charge information and invoices the appropriate subscribers. This set of functions can naturally be administered such that the subscriber receiving the callback always bears the charges for callback.

Referring now to FIG. 2, there is shown a flowchart for the method according to the invention:

A first subscriber calling a second subscriber and reaching only the latter's voice mailbox can use a "Prompt and Collect" function to enter a selection menu for setting automatic callback (referred to as acknowledgement here) for his voice/fax message.

To this end, the first subscriber can use a first check A1 to decide whether he wants automatic callback or an acknowledgement. If the first subscriber does not want automatic callback or an acknowledgement, then he can store his voice/fax message for the second subscriber directly (step S1). Optionally, the service can be configured such that the second subscriber can otherwise use a second check A2 to decide whether to accept the charges for the callback or the acknowledgement. If the first subscriber accepts the charges for the callback or the acknowledgement, then the flag 11 in the charge device 7 is set (step S2). If, on the other hand, the second subscriber is to accept the charges for the callback or the acknowledgement, then the flag 11 in the charge device 7 remains unset.

In step S3, the subscriber number for the callback or the acknowledgement is signaled by the first subscriber, or, if the telecommunications network is providing the subscriber number for the first subscriber, the caller ID (i.e., his subscriber number) is accepted.

The first subscriber then signals a time period which—as soon as it has been exceeded—triggers an automatic callback without the voice/fax message being retrieved (step S4).

Next, the voice/fax message from the first subscriber is stored together with the subscriber number for the acknowledgement or the callback in step 5. From this instant, the timer needed to establish that the time has been exceeded for the voice/fax message begins to run.

If the voice/fax message is not retrieved by the second subscriber within a prescribed time period, a callback or an acknowledgement containing a warning is sent to the subscriber number stored with the voice/fax message (check A3, step S6). If, on the other hand, the voice/fax message is retrieved within the prescribed time period, then the subscriber number stored with the voice/fax message is sent a callback or an acknowledgement containing the retrieval time and the subscriber number of the retrieving party (check A4, step S7).

In this context, the acknowledgement for an appropriate subscriber can be transmitted to a mobile telephone using SMS, or to a pager using a text message, or else as an automatic voice announcement. By way of example, it is also conceivable for the acknowledgement callback to be transmitted by e-mail if an e-mail address has been entered instead of the subscriber number.

I claim:

1. A method of processing messages in an intelligent network, which comprises:
   receiving in a network server an incoming call from a first subscriber and, if the call contains a message, calling up a storage service with a trigger device, and storing the message on one of a storage server and in a subscriber terminal of a subscriber being called;
   storing with the storage service a subscriber number transmitted together with the message;
   starting a timer in the network server; and
   if appropriate signaling is present, setting a first flag, in one of the storage server and the subscriber terminal, for a callback to the first subscriber upon the message being retrieved or upon a prescribed timer value being exceeded without retrieval of the message.

2. The method according to claim 1, wherein the message is a voice message and the calling up step comprises calling up a voice message service and storing the voice message in a voice storage server.

3. The method according to claim 1, which comprises setting, with the storage service, a second flag in the network server, for booking charges incurred with the callback to a given subscriber number.

4. The method according to claim 1, which comprises sending a text message to the subscriber number in the callback, the text message selectively containing a time data record when the message was retrieved or a warning report if the prescribed time period has been exceeded.

5. The method according to claim 4, wherein the sending step comprises sending a text message to a mobile terminal as a Short Message Service (SMS) communication.

6. The method according to claim 4, wherein the sending step comprises sending a text message to a pager.

7. In an apparatus for storing messages from a subscriber in an intelligent network, wherein a network server has a trigger device and a control device, the trigger device drives the control device to call up a message storage service, and the control device is connected to a voice storage server or to a subscriber terminal, the improvement which comprises:
   a callback device connected to and driven by the control device for initiating automatic callback to the subscriber upon the message being retrieved, and a timer connected to and driven by the control device for starting said callback device for initiating automatic callback to the subscriber upon a prescribed timer value being exceeded without retrieval of the message.

8. The apparatus according to claim 7, wherein the messages are voice messages and the message storage service is enabled to store voice messages.

9. The apparatus according to claim 7, wherein the network server has a charge device for recording charges, said charge device being connected to and driven by the control device.

10. The apparatus according to claim 7, wherein said timer has a counter, a register for storing the prescribed timer value and a comparator, said comparator comparing a register content and a counter reading and, if the register content and the counter reading are the same, said comparator outputting a signal for evaluation by the control device.

11. The method according to claim 1, wherein the message is a fax message and the calling up step comprises calling up a fax message service and storing the fax message in a fax storage server.

12. In an apparatus for storing messages from a subscriber in an intelligent network, wherein a network server has a trigger device and a control device, the trigger device drives the control device to call up a message storage service, and the control device is connected to a fax storage server or to a subscriber terminal, the improvement which comprises:
   a callback device connected to and driven by the control device for initiating automatic callback to the subscriber upon the message being retrieved, and a timer connected to and driven by the control device for starting said callback device for initiating automatic callback to the subscriber upon a prescribed timer value being exceeded without retrieval of the message.

13. The apparatus according to claim 12, wherein the messages are fax messages and the message storage service is enabled to store fax messages.

14. The apparatus according to claim 12, wherein the network server has a charge device for recording charges, said charge device being connected to and driven by the control device.

15. The apparatus according to claim 12, wherein said timer has a counter, a register for storing the prescribed timer value and a comparator, said comparator comparing a register content and a counter reading and, if the register content and the counter reading are the same, said comparator outputting a signal for evaluation by the control device.

* * * * *